INVENTOR
JAMES M. COYNER
BY
Carl C. Batz
ATTORNEY

Patented Nov. 18, 1941

2,263,069

UNITED STATES PATENT OFFICE 2,263,069

SYSTEM FOR FEEDING SUCKLING ANIMALS

James M. Coyner, Madison, Wis., assignor to Armour and Company, Chicago, Ill., a corporation of Illinois Application August 1, 1939, Serial No. 287,800

5 Claims. (Cl. 119—71)

This invention relates to a system for feeding suckling animals, and deals particularly with improved apparatus for feeding large numbers of suckling calves.

In the handling of calves intended for veal, large numbers of calves are frequently transported from one part of the country to another or are held in stock yards for considerable periods of time before they are slaughtered. During this time they are rarely given any nourishment at all because it is so difficult to feed a calf which has been accustomed only to the natural sucking from its mother. Such calves cannot digest grains or grasses and have not been taught to drink except by sucking from their mothers. Though fresh cow's milk were available for feeding the calves the job of teaching large numbers of calves to drink and separately feeding each one would be so tedious and time consuming as to render such idea altogether impractical.

Another difficulty in the feeding of suckling calves is that fresh cow's milk is not available at the centers where the calves are fed or if it is available is so expensive as to be impractical for calf feeding. In my copending application Serial No. 274,283, filed May 17, 1939, I describe a satisfactory food made from milk powder. This milk powder from which the calf food is prepared can be easily transported or stored without spoiling and makes an excellent food if means can be devised to make it easily available to large numbers of calves.

As a result of these feeding difficulties the usual practice has been not to feed the veal calves at all, and during the holding periods the calves become very hungry and suffer greatly from lack of nourishment. While it is true that absence from their mothers contributes to their discomfort, I have found that a very large part of the calves' unhappy condition is due to lack of nourishment, and that when given the proper nourishment the constant blatting usually heard is abated and the animals appear more at ease.

In addition to the appeasement of the suffering of these small calves, a workable system for feeding them gives returns in the volume and quality of the meat obtained. After institution of my improved feeding system it has been found that shrinkage is very greatly reduced, and the meat obtained averages at least one grade higher in quality.

What is desired is a system whereby suckling animals, particularly calves, may be fed in large numbers quickly and easily and under conditions which simulate as nearly as possible the natural way of feeding from their mothers.

In providing an adequate system, I employ feeding pens equipped at their sides with gates on which feeding pails are mounted. Each of the pails has a nipple from which the animals may feed. A supply tank is provided to contain the liquid feed and conveyor means is arranged to deliver milk from the tank to each of the feeding pails. The calves to be fed may be driven from a holding pen into a feeding pen, and after they have been fed may be led from the feeding pen by merely opening the gates carrying the pails from which they have been feeding. Another feature of my improved system is that the pails, although secure for feeding, are easily removed for cleaning, and all parts of the system which contain feed may be easily cleaned. Other features and advantages will become apparent as the specification proceeds.

Following is a detailed description of one embodiment of the invention illustrated by the accompanying drawings in which.

Figure 1:
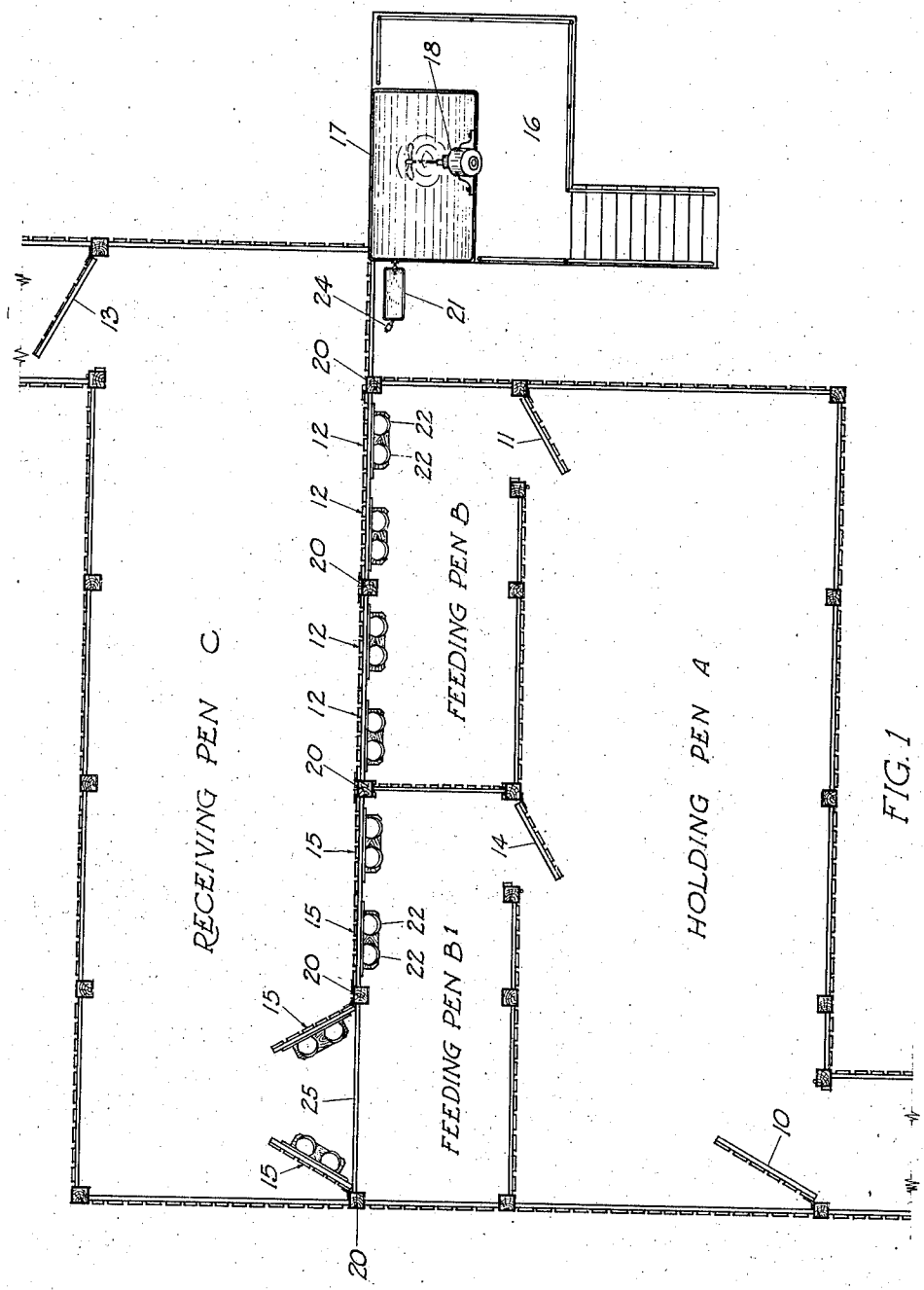
Figure 1 is a plan view of the improved feeding system.

Referring first to Figure 1, the embodiment illustrated has two feeding pens B and $B_1$, a holding pen A, and a receiving pen C. A gate 10 leads into the holding pen A, and from this pen the gate 11 leads into feeding pen B. Any one of gates 12 lead from the pen B into the receiving pen C, and the gate 13 is the exit from the holding pen. The gate 14 leads from the holding pen A into the feeding pen $B_1$, and any of gates 15 lead from the pen $B_1$, into the receiving pen C.

Figure 2:
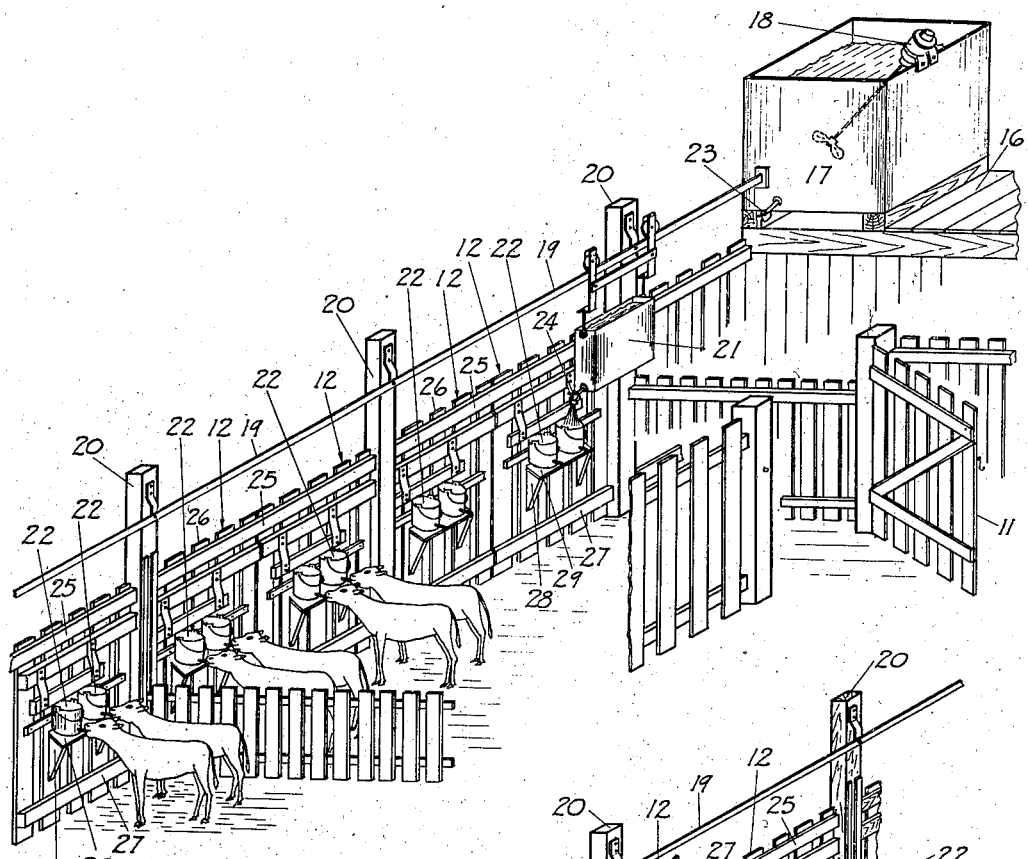
Figure 2 is a broken perspective view showing calves being fed.
Figure 3:
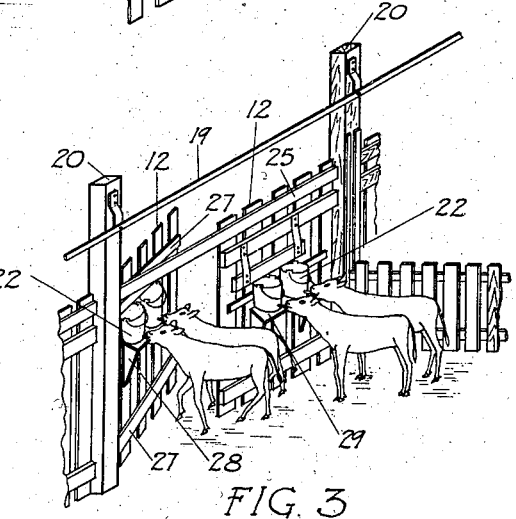
Figure 3 is a broken perspective view showing the manner in which the calves may be led from the feeding pen.
Figure 4:
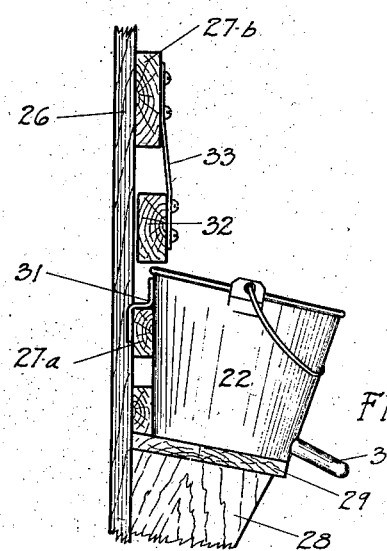
Figure 4 is a detail elevational view showing the mounting of the pails on the gates.

At the end of feeding pen B is an elevated platform 16, and on this platform is mounted the supply tank 17 seen more clearly in Figure 2. This tank is equipped with a stirring device 18 which may comprise an electric motor having an agitator shaft connected to its rotor.

A conveyor rail 19 extends from tank 17 along one side of pens B and $B_1$, and is secured to the extended posts 20. A conveyor container 21 is mounted on rail 19 by means of brackets and rollers so as to move from a position adjacent tank 17 along rail 19 over each of the pails 22. The tank 17 is provided with an outlet valve 23 from which milk may be quickly discharged from the tank into the open top of the conveyor container 21 to fill it, and container 21 is equipped with an outlet 24 from which its contents may be discharged into any one of the pails 22 to fill them.

The feeding pens B and $B_1$ are specially constructed on the sides adjacent the receiving pen C. In the construction illustrated the spaced posts 20 have extending between them a top strip 25 which serves to support the posts and also as a stop for the gates when in closed condition. A pair of gates 12 is mounted between each of posts 20 one of the pair being hingedly supported on one post and the other being supported on the other post, both gates of the pair being arranged to swing outwardly of the feeding pen.

The gates 12 here shown are formed of upright slats 26 and horizontal slats 27. Mounted on the inside of each gate is a bracket 28 having a shelf 29 which is inclined downwardly toward the interior of the feeding pen. The feeding pails 22 are carried on shelves 29 and provided with rear hangers 31 which hook over the transverse slat 27a. To hold the pails 22 releasably in place I provide a transverse piece 32 suspended by flexible members 33 from the slat 27b. The flexible members 33 may be such as a heavy leather strip or a metal spring.

The pails 22 have at their lower portions nipples 34 which extend toward the interior of the feeding pens and in a position convenient for a calf to suck from. It will be seen that the bottom of the pails is inclined toward the nipples when the arrangement is as above described. The particular pails used may be the type described in my copending application Serial No. 275,037, filed May 22, 1939.

In the operation of the improved system, the attendant may place the proper proportions of powder and liquid in tank 17 and use the stirrer 18 to thoroughly dissolve the powder and form a homogenous liquid milk food. Then the conveyor tank 21 may be brought adjacent supply tank 17 and filled by opening the valve 23. The conveyor tank 21 then can be moved over each of the pails 22 in pen B and each of these pails filled by operation of the outlet 24.

In the construction illustrated pen B has four gates 12 each supporting two pails 22, and eight calves may be admitted through gate 11 into pen B. The calves proceed by instinct and habit to suck the nipples 34 and soon empty the pails.

While the calves are sucking in pen B, the attendant may operate the conveyor apparatus to fill each of pails 22 of pen B₁ and then admit eight calves through gate 14 into this pen.

Then when calves in pen B have emptied their pails the attendant may open the gates which carry the pails thus leading the calves from the feeding pen. Though the milk in the pails be exhausted, the calves will continue to suck and will quite naturally follow the nipples and be led from the pen. Once the calves which are fed are out of the feeding pen, the gates may be again closed and the pails filled again.

By having two feeding pens the attendant can be filling the pails in one pen while the calves are feeding in the other. However, my invention can be practiced very well when only one feeding pen is employed.

When it is desired to clean the pails the piece 32 is turned upwardly to permit the pail to be raised and the hanger 31 unhooked from slat 26a. The conveyor tank 21 may be unhooked from the rail 19 when necessary for cleaning, and the large supply tank 17 may also be easily cleaned.

Though the foregoing detailed explanation has been given with particular reference to the feeding of calves, it is apparent that the system is also applicable for the feeding of other suckling animals, such as sheep, goats, etc.

In the single embodiment described and shown details of construction have been given for clearness of understanding without any intention of limiting my invention to such construction, and it will be apparent to those skilled in the art that many changes may be made without departing from the spirit of the invention.

Having thus described my invention, what I claim is:

1. In apparatus of the character set forth for the feeding of suckling animals, a feeding pen and a receiving pen, said pens being separated by a common partition wall, said partition comprising gates supported for swinging outwardly from said feeding pen into said receiving pen, and liquid-feeding containers secured upon each of said gates and equipped with nipples, whereby the opening of said gates causes the animals which have been feeding to move from said feeding pen into said receiving pen.

2. In apparatus for feeding suckling animals, a feeding pen and a receiving pen, at least one wall of said feeding pen forming a partition between said pen and the receiving pen, said partition consisting mainly of gates supported for outward swinging movement into said receiving pen, a plurality of liquid-feeding containers supported upon each of said gates and each container being equipped with a nipple, said gates being swingable into said receiving pen to lead the animals which have been feeding at said nipples from said feeding pen into said receiving pen.

3. In apparatus for feeding suckling animals, a feeding pen and a receiving pen, a partition wall between said feeding pen and said receiving pen, at least one gate supported within said partition wall for providing a passage from said feeding pen into said receiving pen, and at least one liquid-feeding container supported upon said gate and equipped with a nipple, said gate being swingable outwardly into said receiving pen to lead the animal which has substantially finished feeding at said nipple but continues to cling to it from said feeding pen into said receiving pen.

4. In a feeding pen having a wall consisting of gates supported for swinging outwardly from the pen, liquid-feeding containers secured upon each of said gates and equipped with nipples, whereby the opening of said gates causes the animals which have completed feeding by exhausting the contents of the containers, to move from said feeding pen.

5. The method of causing a feeding suckling animal to move from one enclosure to another, which comprises the steps of positioning the animal in a feed enclosure, positioning a suckling feeding source in swinging relation to both enclosures, permitting the animal to suck liquid feed while so positioned, maintaining the liquid feed source in a swingable relation to both enclosures, and temporarily stationary during the feeding operation, causing the feed source to swing after the feeding operation has been completed, and permitting the animal to maintain itself in contact relation to the feed source during the swinging movement of the feed source, to thereby lead the animal from a position in one enclosure to a position in the other enclosure.

JAMES M. COYNER.